US010445458B2

(12) United States Patent
Chobanyan et al.

(10) Patent No.: US 10,445,458 B2
(45) Date of Patent: Oct. 15, 2019

(54) POWER PROXIMITY VERIFICATIONS FOR ELECTRONIC CIRCUIT DESIGNS

(71) Applicant: HEWLETT PACKARD ENTERPRISE DEVELOPMENT LP, Houston, TX (US)

(72) Inventors: Elene Chobanyan, Fort Collins, CO (US); Karl J Bois, Fort Collins, CO (US); Charles Andrew Hartman, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 89 days.

(21) Appl. No.: 15/280,906

(22) Filed: Sep. 29, 2016

(65) Prior Publication Data

US 2018/0089358 A1 Mar. 29, 2018

(51) Int. Cl.
*G06F 9/455* (2018.01)
*G06F 17/50* (2006.01)

(52) U.S. Cl.
CPC ...... *G06F 17/5081* (2013.01); *G06F 2217/78* (2013.01)

(58) Field of Classification Search
USPC ........................................ 716/112, 114, 136
See application file for complete search history.

(56) References Cited

U.S. PATENT DOCUMENTS

| 6,922,822 | B2* | 7/2005 | Frank | G06F 17/5077 716/112 |
| 2005/0132306 | A1* | 6/2005 | Smith | G06F 17/5068 716/114 |
| 2011/0106481 | A1* | 5/2011 | Liang | G01R 31/2806 702/117 |
| 2011/0260318 | A1* | 10/2011 | Eisenstadt | G06F 17/5054 257/737 |
| 2012/0297356 | A1* | 11/2012 | Wu | G06F 17/5081 716/136 |

* cited by examiner

*Primary Examiner* — Brian Ngo
(74) *Attorney, Agent, or Firm* — Nolte Intellectual Property Law Group

(57) ABSTRACT

Examples describe a system that may include an input engine and a proximity verification engine. The input engine may access an electronic circuit design of an electronic design automation (EDA) tool, may identify a particular signal net and a particular power net the particular signal net is referenced to in the electronic circuit design. The input engine may further identify a particular signal via in the electronic circuit design corresponding to the particular signal net and power vias in the electronic circuit design corresponding to the particular power net. In such examples, the proximity verification engine may also verify that the particular signal via is within a threshold distance from at least one of the power vias and generate a proximity alert in response to a determination that none of the power vias are within the threshold distance from the particular signal via.

20 Claims, 5 Drawing Sheets

POWER PROXIMITY VERIFICATIONS FOR ELECTRONIC CIRCUIT DESIGNS

BACKGROUND

Computing systems include hardware, for example as circuitry implemented through printed circuit boards (PCBs) and integrated circuits (ICs). PCBs and ICs are becoming increasingly large and complex, typically including millions of individual circuit elements such as transistors and logic gates. As a result of this increased size and complexity, PCB and IC designers are increasingly using electronic design automation (EDA) software tools to assist with PCB and IC design.

BRIEF DESCRIPTION OF THE DRAWINGS

The following detailed description references the drawings, wherein.

DETAILED DESCRIPTION

Figure 1:
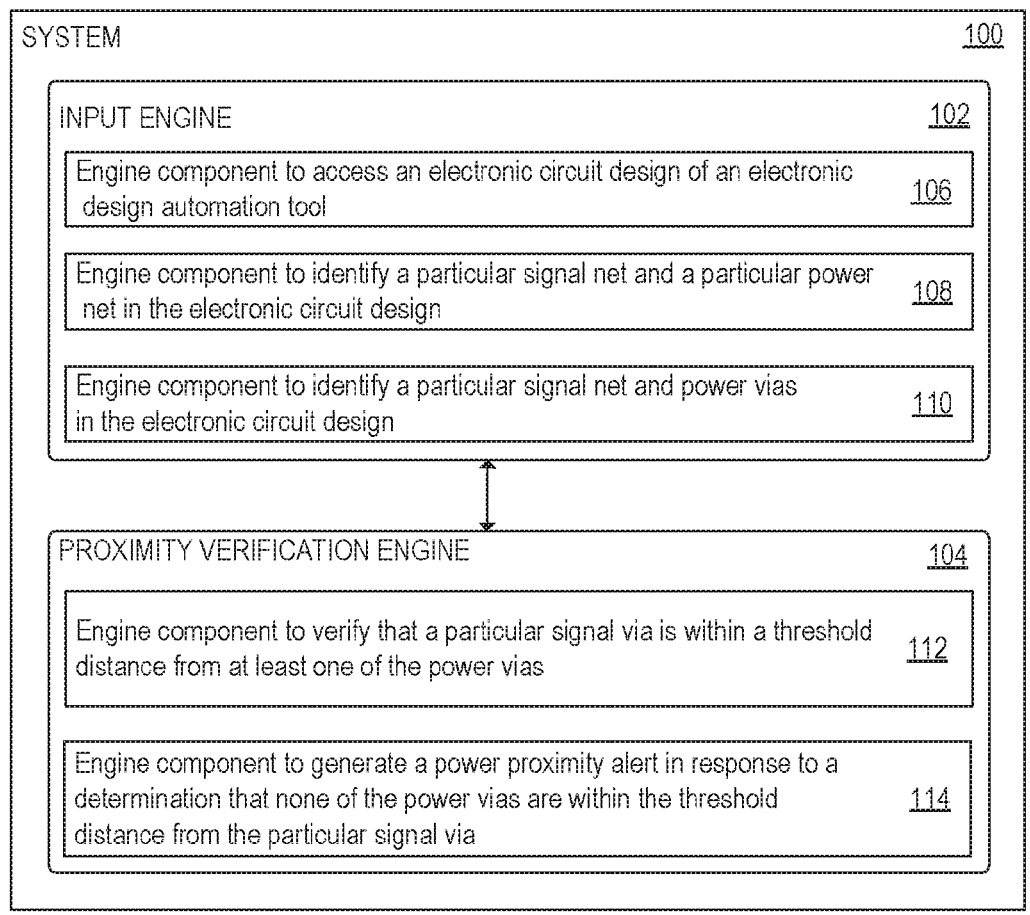
FIG. 1 shows an example of a system that supports power proximity verifications for an electronic circuit design.

Examples herein described relate to electronic circuit design and, more particularly, to techniques for checking proximity of power vias to signal vias in electronic circuit designs. An electronic circuit design may refer to any electronic representation of an electronic circuit. Electronic design automation (EDA) tools may create, modify, and export electronic circuit designs, which may support the design of physical circuits in a virtual representation prior to actual physical manufacture. Electronic circuit designs may thus include elements of physical electronic circuits, including nets and vias. A net may refer to a connectivity element of the electronic circuit, for example as a conductor or trace that interconnects two or more component terminals of an IC or a PCB. EDA tools may support the ability to design PCBs, ICs and other electronic circuits that include layouts with multiple different conductive planes, such as ground or power planes.

As used herein, "via" may refer to any electronic connection between layers in the electronic circuit design. Example vias of an electronic circuit design may include signal vias through which nets traverse across different planes. Example types of vias include microvias, point through holes, blind via transitions for differential and single-ended signaling, etc. Other example vias include power and ground vias, which may be used for ensuring ground or power stitching, providing proper signal isolation or a reference change, etc. Some signals are referenced to ground and some are referenced to power. For example, in Double Data Rate 4 (DDR4) memory protocol, data and command signals are referenced to power. Accordingly, the return path or reference vies for these signals are the power vias.

Printed circuit boards mechanically support electronic components and electrically connect them by conductive traces (microstrip and strip-line transmissions lines) vias, pads, electrical contacts and or other features. The traces may be etched from (conductive) copper layers laminated onto an isolating substrate, such as glass-reinforced epoxy laminate (FR4). In these printed circuit boards, a signal path might combine microstrip and stripline portions in different layers and include a via transition between them. In these circuits it is important that there be at least one power via sufficiently close to each signal via to ensure an adequate return path and signal integrity for signals referenced to power and connected through the signal via. The existence of these power vias located sufficiently close to the signal via transitions may also smooth the trace-to-via-to-trace impedance change and hence improve insertion and return losses of the signal net under consideration.

In order to achieve a good signal integrity in an electronic circuit design an adequate current return path is required. Thus, vias for high-speed or low-speed links that are referenced to power in an electronic circuit design may have at least one power via at a distance smaller than a predefined threshold. The pre-defined threshold distance will depend on the specific electronic circuit design. Examples of threshold distances may be 60 mil for high-speed signal vias and 120 mil for lower-speed signal vias.

Examples herein disclosed may support power proximity verifications, hereinafter referred to as proximity verifications, for signal vias and return vies of an electronic circuit design. Signal vias not having at least one return via, such a power via, in an electronic circuit design at a distance less than or equal to a pre-defined threshold distance may adversely impact the signal integrity of the whole signal channel. The threshold is set depending on the electronic circuit design. The proximity verification features disclosed herein may support detection of those signal vias not having a return via within the threshold distance. The proximity verification features disclosed herein may also support detection of the closest return via to the signal via under consideration to assist the circuit designer in modifying the circuit to meet the design constraints.

As described in greater detail below, the proximity verification may be applied to signal vias by creating a proximity verification area surrounding a particular signal via to check if at least one power via associated with the signal via is to be within the proximity verification area. Through such detections, the features described herein may support identification of problematic circuit elements or designs that may result in the decreased performance, malfunctioning; or failure of electronic circuits.

FIG. 1 shows an example of a system 100 that supports proximity verifications for an electronic circuit design. The system 100 may take the form of any computing system. As used herein, a computing system may be a desktop computer, laptop (or notebook) computer, workstation, tablet computer, mobile phone, smart device, servers or any other processing device or equipment including a processing resource. The system 100 may support execution of various EDA tools to design electronic circuits.

As described herein, the system 100 may support proximity verifications for vias in an electronic circuit design by automatically determining whether a particular signal via of a particular signal net in the electronic circuit design has at least one power via, of a power net the signal net is referenced to, at a distance less than or equal to a pre-defined threshold distance. For example, the system 100 may determine whether a particular signal via of a signal net is located within a threshold distance from at least one power via of the power net associated with that signal net. If the system 100 determines that none of the power vias associated with a particular signal via is located within the threshold distance, the system 100 may identify the particular signal via as a violating signal via (signal via that may compromise signal integrity of the electronic circuit design). As also described herein, the system 100 may further generate proximity alerts for violating signal vias, or for the respective violating signal nets, in violation to respective threshold distance criteria with respect to the corresponding power vias.

The system 100 may implement various engines to provide or support any of the proximity verification features described herein. In the example shown in FIG. 1, the system 100 implements an input engine 102 and a proximity verification engine 104. Although many of the proximity verification features disclosed herein are described with respect to the input engine 102 and the proximity verification engine 104, various other suitable forms and implementations for the system 100 may be utilized.

The system 100 may implement the engines 102 and 104 (including components thereof) in various ways, for example as hardware and programming. Thus the input engine 102 and the proximity verification engine 104 may be any combination of hardware and programming to implement the functionalities of the proximity verification features. In some examples, the functionalities of the input engine 102 and the proximity verification engine 104 may be at least partially implemented in the form of electronic circuitry. The programming for the engines 102 and 104 may take the form of processor-executable instructions stored on a non-transitory machine-readable storage medium, and the processor-executable instructions may, upon execution, cause hardware to perform any of the features described herein. In that regard, various programming instructions of the engines 102 and 104 may implement engine components to support or provide the features described herein.

The hardware for the engines 102 and 104 may include a processing resource to execute programming instructions. In some examples, the system 100 implements multiple engines using the same system features or hardware components (e.g., a common processing resource).

The input engine 102 and the proximity verification engine 104 may include components to implement any combination of the features discussed herein. As shown in the example implementation of FIG. 1, the input engine 102 may include engine components 106 to access an electronic circuit design of an electronic design automation tool. Such example may further include engine components 108 to identify a particular signal net and a particular power net, the particular signal net is referenced to, in the electronic circuit design and engine components 110 to identify a particular signal via from the particular signal net and power vias from the particular power net. As also shown in the example implementation of FIG. 1, the proximity verification engine 104 may include engine components 112 to verify that a particular signal via is within a threshold distance from at least one of the power vias and engine components 114 to generate a proximity alert in response to a determination that none of the power vias is within the threshold distance from the particular signal via.

Figure 2:
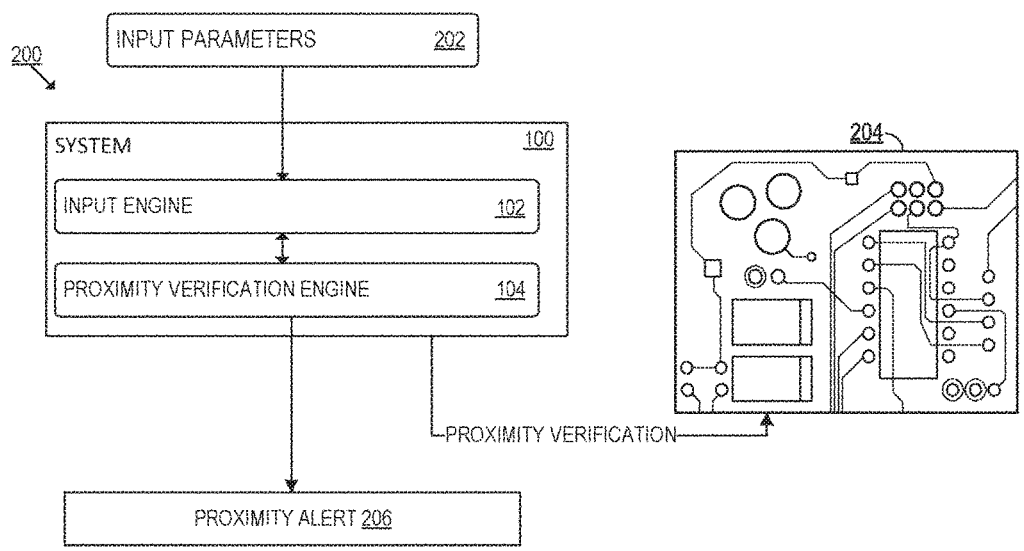
FIG. 2 shows an example of an architecture that supports generation of proximity alerts as part of a power proximity verification for an electronic circuit design.

FIG. 2 shows an example of an architecture 200 that supports generation of proximity alerts as part of proximity verifications for electronic circuit designs. The example architecture 200 shown in FIG. 2 includes a system 100 implementing an input engine 102 and a proximity verification engine 104 as described in FIG. 1. The input engine 102 and proximity verification engine 104 may function separate from, in combination with, or as part of an EDA tool. In some examples, the programming of the input engine 102 and the proximity verification engine 104 may include script instructions supported by the EDA tool, and the EDA tool may support, trigger, or provide the proximity verification features implemented by the input engine 102 and the proximity verification engine 104.

In operation, the input engine 102 and proximity verification engine 104 may verify that signal vias of an electronic circuit design satisfy threshold distance criteria having at least one power via within a threshold distance. The input engine 102 accesses some input parameters 202 applicable to a particular electronic circuit design 204. Through the input parameters 202, the input engine 102 may determine which particular signal nets of an electronic circuit design to perform the proximity verification for, the specific threshold distance applicable to the particular signal nets, and the like. In some examples, the inputs or input parameters 202 are specified and configured through a user-provided input file, as user inputs provided through a user interface (e.g., command line or script-prompted interface), as code parameters, through interfaces provided by an EDA tool itself or in various other ways.

For example, the input parameters 202 may specify a list of signal nets upon which to perform a proximity verification. The input parameters 202 may include net names, net types or net keywords, through which the input engine 102 may identify and list of particular signal nets and associated power nets of the electronic circuit design 204. Through the input parameters 202, the input engine 102 may identify and list a selected subset of the nets of the electronic circuit design 204 for a proximity verification, such as a list of high-speed or performance-sensitive nets of the electronic circuit design 204. Once the input engine 102 has identified and listed the particular signal nets of the electronic circuit design 204, the input engine may also identify and list the power nets associated with each one of the particular signal nets.

In some other examples, the input parameters 202 may specify threshold distances applicable to each of the specified nets. The input engine 102 may identify a respective threshold distance applicable to nets in the electronic circuit design 204, for instance through a specified global threshold distance applicable to each net in the electronic circuit design 204, through a specific threshold distance assigned to an individual net or specific group of nets, or as a combination of both. In some implementations, the input parameters 202 may specify a default threshold distance applicable for the nets in the electronic circuit design 204 as well as individual or group threshold distances applicable to specific nets of the electronic circuit design 204 (and which may thus override the default threshold distance).

As noted above, the input parameters 202 may be set forth, in part or in whole, through an input file. In such examples, the input engine 102 may identify nets for proximity verification based on net names, net keywords, or both, specified in a user-provided input file. As another example, the input engine 102 may identify threshold distances applicable to various nets of the electronic circuit design 204 from the user-provided input file.

The proximity verification engine 104 may perform the proximity verification for the electronic circuit design 204 according to the parameters specified in the input parameters 202. A proximity verification may apply threshold distance criteria that are satisfied when at least one power via is within a pre-defined threshold distance from the signal via under verification in the electronic circuit design 204. To perform the verification, the proximity verification engine 104 may parse through the electronic circuit design 204 and analyze the location and pathing of various nets to determine whether any of the power vias associated with a particular reference power net is within the pre-defined threshold distance of a particular signal via. If none of the power vias is within the pre-defined threshold distance from the signal via under verification, the proximity verification engine 104 may identify such signal via as a violating signal via that does not satisfy the threshold distance criteria. Besides, the signal net to which the signal via belongs, may be also identified as a violating signal net.

For identified signal nets, the proximity verification engine 104 may automatically trigger the proximity verification for each one of the signal vias of each one of the signal nets. When the input parameters 202 specify specific threshold distances that individually differ among the specified nets, the proximity verification engine 104 may flexibly configure the proximity verification according to the specific threshold distances.

From the proximity verifications, the proximity verification engine 104 may determine which of the identified signal nets fail to have a power via within the threshold distance from the signal via. That is, the proximity verification engine 104 may identify any particular power via(s) of the electronic circuit design 204 that are positioned, at least in part, within a threshold distance (applicable to the particular signal via to which the power net is associated) from the signal via of the electronic circuit design 204. The proximity verification engine 104 may compile a list of the violating signal vias and nets determined from the distance verifications, and output the list through a user interface.

As a particular feature, the proximity verification engine 104 may further process the results of the proximity verification to determine whether the electronic circuit design 204 includes a proximity violation. The proximity verification engine 104 may identify a proximity violation when one particular signal via does not have a power via within a respective threshold distance. In response to a determination of a proximity violation, the proximity verification engine 104 may generate a proximity alert 206. The proximity alert 206 may be any output indication specifying that one signal via violates threshold distance criteria. As examples, the proximity verification engine 104 may generate a proximity alert 206 for presentation through a graphical user interface of an EDA tool, as text presented in the output file, or in various other forms.

Presentation of the proximity alert 206 may include presentation of a visual indication specifying the particular signal via for which none of the power vias is within the threshold distance, e.g., by identifying the particular signal via and flagging or otherwise noting the placement of the signal via. The proximity verification engine 104 may further determine a distance between the violating signal via and the closest power via. In doing so, the proximity alert 206 may further include presentation of a visual indication specifying the particular power via having the minimum distance to the violating signal via. The visual indications may include highlighting or flagging the violating signal vias, the respective closest power vias and the nets to which they belong, e.g., in a different color, format, or pattern used to flag the violating signal vias, the respective closest power vias or the entire nets to which they belong.

Figure 3:
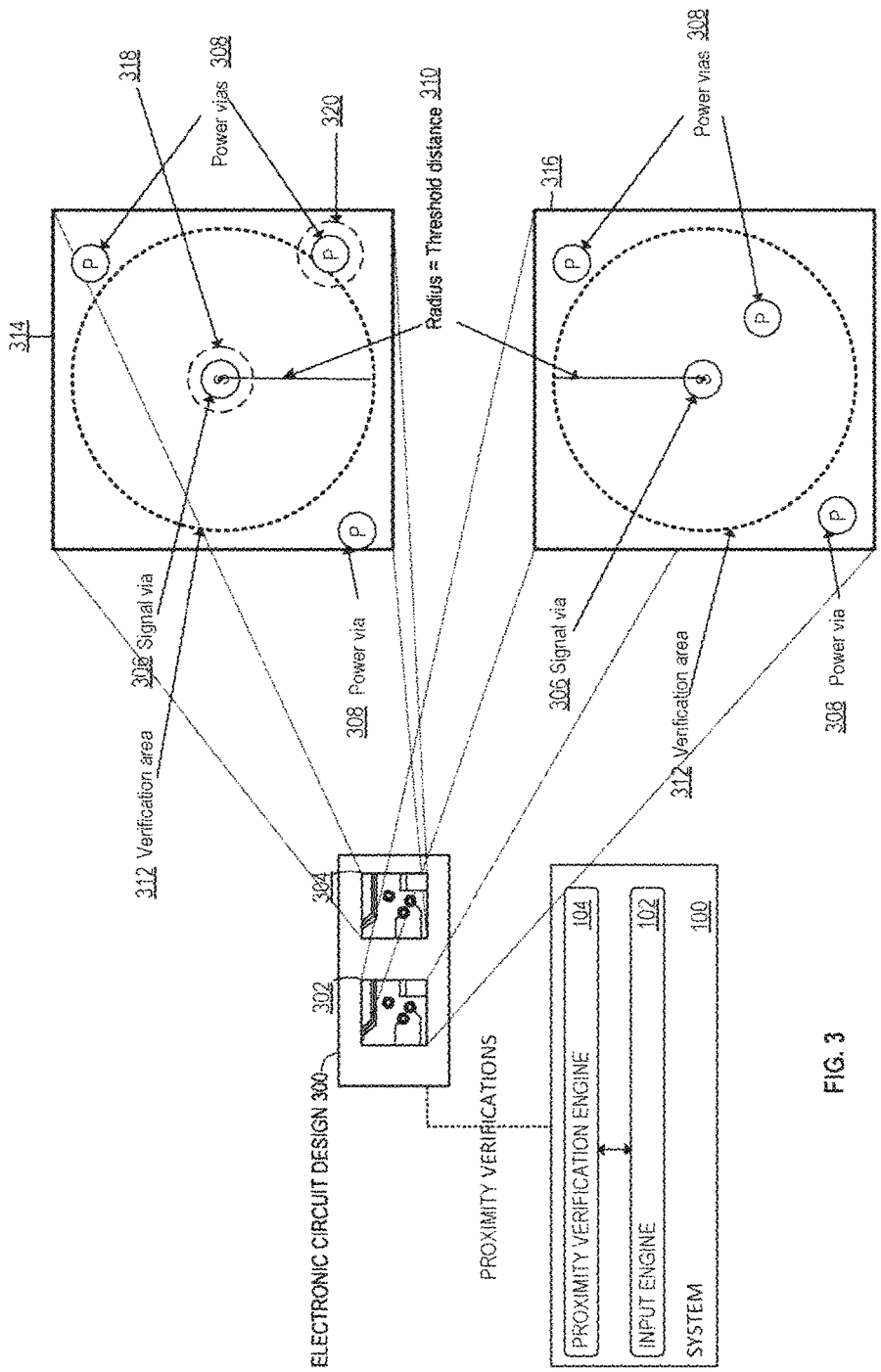
FIG. 3 shows an example scenario in which a proximity verification engine may generate a proximity alert for a particular signal via in an electronic circuit design.

FIG. 3 shows an example scenario in which proximity verifications are performed for two specific portions 302, 304 of an electronic circuit design 300. The example scenario 300 shown in FIG. 3 includes the system 100 implementing an input engine 102 and a proximity verification engine 104 of FIG. 1. However, any other device, hardware-programming combination, or other suitable computing system may be used in the scenario of FIG. 4, such as the example system of FIG. 5.

In the example shown in FIG. 3, the proximity verification engine 104 performs a proximity verification for two specific portions 302, 304 of the electronic circuit design 300. The two specific portions 302, 304 are shown through respective plane views 314, 316 which respectively present a first portion 302 and a second portion 304 of a conductive plane in the electronic circuit design 300. After the input engine 102 has identified the signal vias and the respective power vias in the electronic circuit design 300, the proximity verification engine 104 performs the proximity verification for the two portions of the electronic circuit design 300. The plane views 314, 316 includes signal vias 306 and power vias 308. Each one of the plane views 314, 316 comprises one single signal via 306 of a signal net and a plurality of power vias 308 of the power net the signal net is referenced to.

In response to execution of the proximity verification for portion 302, the proximity verification engine 104 may determine that there is a power via 308 within a verification area 312. The verification area 312 corresponds to a circle with center the center of the signal via 306 under consideration and with a radius 310 equal to the threshold distance. Therefore, the proximity verification engine 104 will not trigger a proximity alert for this specific signal via 306.

In response to execution of the proximity verification for portion 304, the proximity verification engine 104 may determine that there is not any power via 308 within the verification area 312. In order to determine that one power via 308 is within the verification area 312, the proximity verification engine 104 verifies whether the center of the power via 308 is within the verification area 312. Plane view 314 shows three power vias 308 wherein none of the power vias 308 have their center within the verification area 312. Thus, the signal via 306 violates the threshold distance criteria (e.g., the particular threshold distance). The proximity verification engine 104 may generate a proximity alert for the signal via 306. In such example, the plane view 314 highlights the violating signal via 306 with a circle 318 surrounding the signal via 306. As such, the proximity verification engine 104 may identify the signal via 306 as a violating signal via. Besides, the proximity verification engine 104 calculates the distances from the signal via 306 to the power vias 308, and determines the power via 308 having a minimum distance. In such example, the plane view 314 highlights the power via 308 located closer to the signal via with a circle 320 surrounding the power via 308. As such, the proximity verification engine 104 may identify how far to the signal via 306 to the closest power via 308 is.

As described above, the input engine 102 and proximity verification engine 104 may implement various proximity verification features that support the identification of violating vias not having any power via within pre-defined threshold distances in an electronic circuit design. In doing so, the proximity verification engine 104 may identify a design characteristics of an electronic circuit design that may impact the functionality and feasibility of a particular circuit design. High performance circuits may be particularly susceptible to such design defects, and the proximity verification features described herein may support circuit design and manufacture avoiding defects. By supporting such verifications at the design stage (e.g., prior to fabrication or mass production), the features described herein may result in increased process efficiencies, reduced resource consumption, flexible design of electronic circuits, and more. The proximity verification features described herein may thus increase overall circuit performance and design effectiveness.

Figure 4:
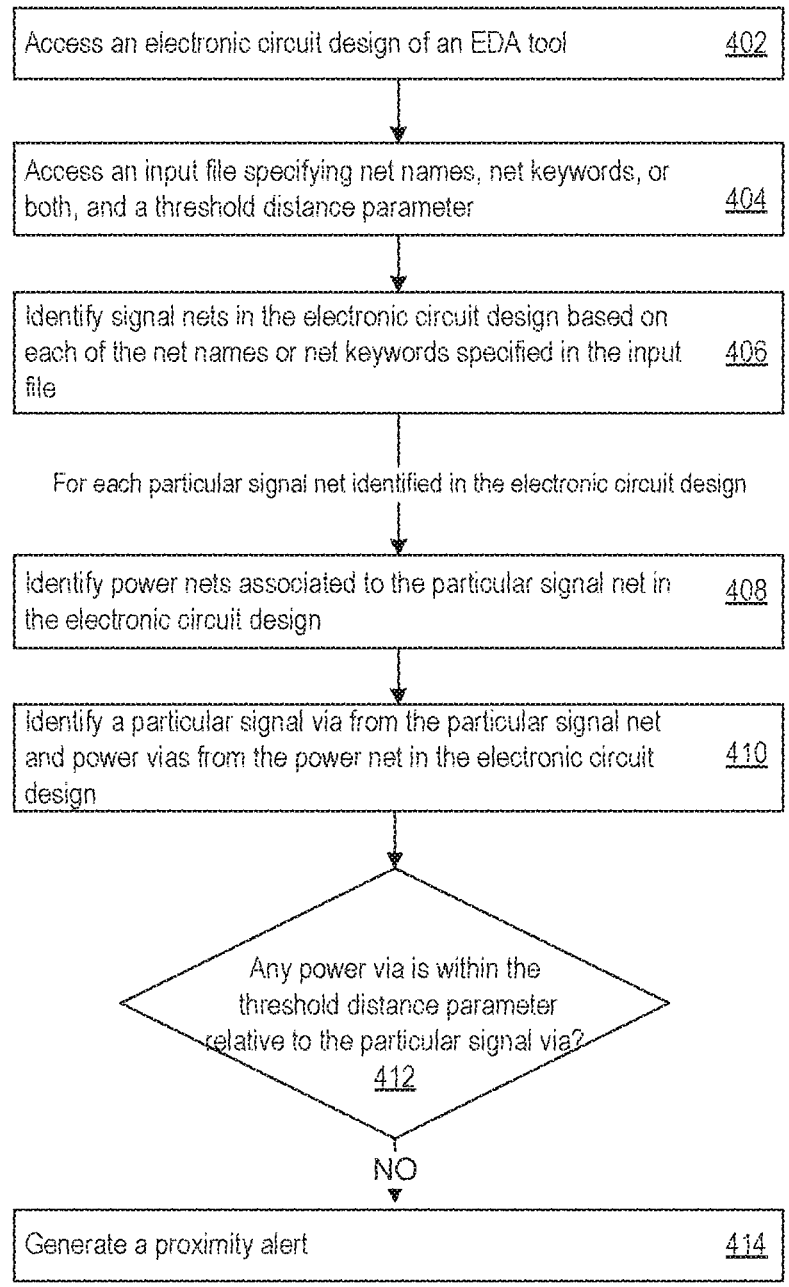
FIG. 4 shows a flowchart of an example method for power proximity verification for an electronic circuit design.

FIG. 4 shows a flow chart of an example method 400 for proximity verification for an electronic circuit design. Execution of the method 400 is described with reference to the system 100 of FIG. 1. However, any other device, hardware-programming combination, or other suitable computing system may execute any of the steps of the method 400. As examples, the method 400 may be implemented in the form of executable instructions stored on a machine-readable storage medium or in the form of electronic circuitry.

In implementing or performing the method 400, the input engine 102 accesses 402 an electronic circuit design of an EDA tool. To do so, the input engine 102 may identify a specific electronic circuit design to perform a proximity verification upon. For instance, the input engine 102 may identify an electronic circuit design currently open in an EDA tool, a particular electronic circuit design specified in a file path (e.g., input by a user), an electronic circuit design co-located with scripting instructions implemented by the input engine 102, or in any number of other ways.

Then, the input engine 102 accesses 404 an input file specifying net names, net keywords, or both, and a threshold distance parameter to perform the proximity verification. The input file may be user-provided and specify net parameters, such as net names or net keywords, to identify specific nets in the electronic circuit design. The input file may include a list of nets to verify, a respective threshold distance parameter applicable to each of the listed nets, and any other distance verification parameters.

The input engine 102 identifies 406 signal nets in the electronic circuit design corresponding to each of the net names or net keywords specified in the input file by, for example, parsing the input file. The input engine 102 may also identify the associated power nets in the electronic circuit design based on the net names or net keywords specified in the input parameters by for example by parsing said input file. When the input file specifies nets through net names, the input engine 102 may identify the net in the electronic circuit design from a netlist of the electronic circuit design (e.g., via a hash table that provides a listing of nets). When the input file specifies nets through net keywords, the input engine 102 may extract the net names from the electronic circuit design, e.g., via the netlist, and parses the listing of net names to identify the net name(s) that include any of the specified net keywords. From such parsing and extraction, the input engine 102 may identify the specific nets for which the proximity verification applies to. The input engine 102 may create a net list including the identified signal nets.

The input file, for example, may identify high-speed link nets in the electronic circuit design comprising high speed link vias for proximity verification, but not other nets like a clock signals, low-speed data buses, etc. In that regard, the input engine 102 may flexibly configure which particular nets in the electronic circuit design the proximity verification will be performed for, which may increase the flexibility and efficiency of such verifications as opposed to a global verification of all nets in the electronic circuit design. This saves implementation time and costs.

In implementing or performing the method 400, for each one of the particular signal nets identified in the electronic circuit design, the proximity verification engine 104 identifies 406 power net the particular signal net is referenced to in the electronic circuit design i.e. the power net the particular signal is referenced to. For example, a user may provide through an input file, as inputs provided through a user interface (e.g., command line or script-prompted interface), as code parameters, through interfaces provided by an EDA tool itself or in various other ways, parameters to identify the power net the signal net is referenced to. The input engine 102 may create a net list including the identified power nets. After that, the input engine 102 identifies 410 a particular signal via form the particular signal net and power vias from the particular power net in the electronic circuit design. The input engine 102 may create respective net lists including the identified signal vias and the identified power vias.

Then, the proximity verification engine 104 determines 412 if at least one of the power vias identified is within the threshold distance from the particular signal via and generates 414 a proximity alert when a signal vias does not have any power via within the threshold distance. The proximity alert will indicate that the identified signal via may be a violating signal via that may result in a decreased performance, malfunctioning, or failure of the electronic circuit design.

In some examples, the proximity verification engine 104 may perform the proximity verification according to specific parameters specific to a particular identified net. For instance, the proximity verification engine 104 may configure the performance of the proximity verification for each one of the identified signal nets or signal vias according to a specific threshold distance specific for each particular identified net or via.

In some examples, the proximity verification engine 104 executes and triggers the proximity verifications by generating a series of shell commands supported by an EDA tool to run verification subroutines with the respective parameters applicable to each particular net. As some, but not all, of the nets of an electronic circuit design may be specified in the input file, the proximity verification engine 104 may trigger proximity verifications for the specified nets, but not for the other nets.

The proximity verification engine 104 may further determine proximity violations by identifying those signal vias (violating signal vias) not having at least one power via within the threshold distance. The proximity verification engine 104 may create an output with the list of violating signal vias. This output may additionally include, for example, the location (e.g., coordinates) of the violating signal vias, which net they belongs to, or more.

In some examples, the proximity verification engine 104 may further determine a distance between the particular signal via and each one of the power vias associated with the particular signal via. In doing so, the proximity verification engine 104 may determine a particular power via, among all the power vias associated with the particular signal via, having a minimum distance to the particular signal via. In such examples, the list of violating signal vias may include the location (e.g., coordinates) of the closest power via.

In some examples, the proximity verification engine 104 may present the proximity alert by presenting a visual indication in the electronic circuit design specifying the particular signal via for which none of the power vias is within the threshold distance parameter. In some other examples, the proximity verification engine 104 may further present the proximity alert by presenting a first visual indication in the electronic circuit design specifying the particular signal via for which none of the power vias is within the threshold distance parameter and a second visual indication in the electronic circuit design specifying the particular power via having the minimum distance to the particular signal via.

Example indications may include flagging or highlighting violating signal vias, and the power via located closer to the violating signal, in a distinct color or pattern from other vias that are not part of a violation.

Although one example was shown in FIG. 4, the steps of the method 400 may be ordered in various ways. Likewise, the method 400 may include any number of additional or alternative steps, including steps implementing any feature described herein with respect to the input engine 102, the proximity verification engine 104, or a combination thereof.

Figure 5:
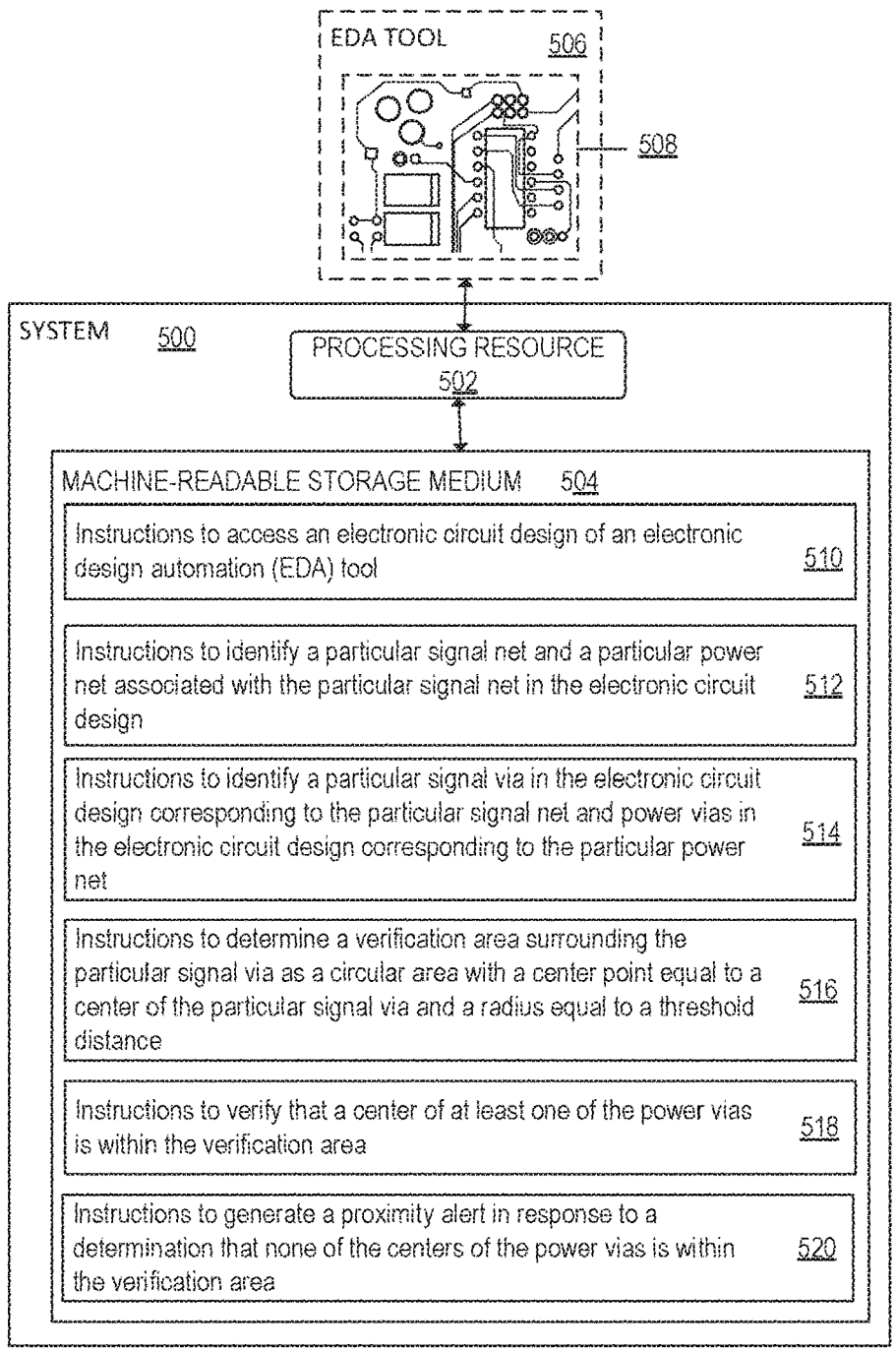
FIG. 5 shows an example system that supports power proximity verification.

FIG. 5 shows an example of a system 500 that supports proximity verifications for an electronic circuit design 508. The system 500 may include a processing resource 502, which may take the form of a single or multiple processors. The processor(s) may include a central processing unit (CPU), microprocessor, or any hardware device suitable for executing instructions stored on a machine-readable medium, such as the machine-readable medium 504 shown in FIG. 5. The machine-readable medium 504 may be any non-transitory electronic, magnetic, optical, or other physical storage device that stores executable instructions, such as the instructions 510-520 shown in FIG. 5. Although the example system 500 is described with reference to components comprised in system 100 of FIG. 1, other suitable computing devices to execute the instructions 510-520 may be utilized. Additionally, implementation of system 500 is not limited to such examples.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions 510-520, may be part of an installation package that, when installed, may be executed by processing resource 504 to implement the functionalities described above. In such examples, storage medium 504 may be a portable medium, such as a CD, DVD, or flash drive, or a memory maintained by a server from which the installation package can be downloaded and installed. In other examples, instructions 510-520 may be part of an application, applications, or component(s) already installed on computing device 500 including processing resource 502. In such examples, the storage medium 504 may include memory such as a hard drive, solid state drive, or the like.

The system 500 may execute instructions stored on the machine-readable storage medium 504 through the processing resource 502. Executing the instructions may cause the system 500 to perform any of the features described herein, including according to any features of the input engine 108, the proximity verification engine 104, or a combination thereof.

For example, execution of the instructions 510-520 by the processing resource 502 may cause the system 500 to access 510 an electronic circuit design of an EDA tool to perform proximity verifications; identify 512 a particular signal net and a particular power net the particular signal net is referenced to, in the electronic circuit design; identify 514 a particular signal via in the electronic circuit design corresponding to the particular signal net and power vias in the electronic circuit design corresponding to the particular power net; determine 516 a verification area surrounding the particular signal via as a circular area with a center point equal to a center of the particular signal via and a radius equal to a threshold distance; verify 518 that a center of at least one of the power vias is within the verification area; and generate 520 a proximity alert in response to a determination that none of the centers of the power vias is within the verification area.

In some examples, the machine-readable storage medium 504 may include instructions executable by the processing resource 502 to identify signal nets in the electronic circuit design and the threshold distance according to user input. In some other examples, the machine-readable storage medium 504 may include instructions executable by the processing resource 502 to present the proximity alert through a user interface, including presenting a first visual indication specifying the particular signal via for which none of the power vias is within the threshold distance and a second visual indication specifying a particular power via having a minimum distance to the particular signal via. Example indications may include flagging or highlighting violating signal vias, and the power via located closer to the violating signal, in a distinct color or pattern from other vias that are not part of a violation.

The systems, methods, devices, engines, and logic described above, including the input engine 102 and the proximity verification engine 104, may be implemented in many different ways in many different combinations of hardware, logic, circuitry, and executable instructions stored on a machine-readable storage medium. For example, the input engine 102 and the proximity verification engine 104, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the input engine 102 and the proximity verification engine 104, or both.

The processing capability of the systems, devices, and engines described herein, including the input engine 102 and the proximity verification engine 104, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as objects, linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

What is claimed is:

1. A system comprising:
an input engine to:
access an electronic circuit design of an electronic design automation (FDA) tool;
identify a particular signal net and a particular power net the signal net is referenced to in the electronic circuit design; and
identify a particular signal via in the electronic circuit design corresponding to the particular signal net and power vias in the electronic circuit design corresponding to the particular power net;
a proximity verification engine to:
verify that the particular signal via is within a threshold distance of at least one of the power vias; and
generate a proximity alert in response to a determination that none of the power vias are within the threshold distance from the particular signal via.

2. The system of claim 1, wherein the proximity verification engine is further to determine a verification area surrounding the particular signal via as a circular area with a center point equal to a center of the particular signal via and a radius equal to the threshold distance.

3. The system of claim 1, wherein the proximity verification engine is further to determine a distance between the particular signal via and each one of the power vias.

4. The system of claim 1, wherein the input engine is to identify the particular signal net and the particular power net referenced to the particular signal net based on net names, net keywords or both, specified in user-provided input files, user inputs provided through a graphical user interface or user-provided code parameters.

5. The system of claim 1, wherein the input engine is further to identify the threshold distance applicable to the particular signal via and the power vias from user-provided input files, user inputs provided through a graphical user interface or user-provided code parameters.

6. The system of claim 1, wherein the proximity verification engine is further to determine the particular signal via is within a threshold distance from at least one of the power vias when a center of the particular signal via is at a distance less than or equal to the threshold distance relative to a center of the at least one power via.

7. The system of claim 1, wherein the proximity verification engine is further to present the proximity alert by presenting a visual indication specifying the particular signal via for which none of the power vias is within the threshold distance.

8. The system of claim 3, wherein the proximity verification engine is further to determine a particular power via having a minimum distance to the particular signal via.

9. The system of claim 8, wherein the proximity verification engine is further to present the proximity alert by:
presenting a visual indication specifying the particular signal via for which none of the power vias is within the threshold distance; and
presenting a visual indication specifying the particular power via having the minimum distance to the particular signal via.

10. The system of claim 7, wherein the proximity verification engine is further to present the proximity alert by presenting a visual indication specifying the signal net which the particular signal via belongs to.

11. A method comprising:
accessing an electronic circuit design of an electronic design automation (EDA) tool;
accessing inputs specifying net names, net keywords or both, and a threshold distance parameter; and
identifying signal nets in the electronic circuit design based on each of the net names or the net keywords specified in the input file;
for each particular signal net identified in the electronic circuit design:
identifying a particular power net the particular signal net is referenced to in the electronic circuit design;
identifying a particular signal via in the electronic circuit design corresponding to the particular signal net and power vias in the electronic circuit design corresponding to the particular power net;
verifying that the particular signal via is within a threshold distance parameter from at least one of the power vias; and
in response to a determination that none of the power vias is within the threshold distance parameter from the particular signal via, generating a proximity alert.

12. The method of claim 11, wherein verifying that the particular signal via is within a threshold distance from at least one of the power vias comprises:
determining a verification area surrounding the particular signal via as a circular area with a center point equal to a center of the particular signal via and a radius equal to the threshold distance parameter; and
verifying that a center of the at least one of the power vias is within the verification area.

13. The method of claim 11, comprising determining a distance between the particular signal via and each one of the power vias.

14. The method of claim 11, comprising determining that the particular signal via is within a threshold distance from at least one of the power vias when a center of the particular signal via is at a distance less than or equal to the threshold distance parameter relative to a center of the at least one power via.

15. The method of claim 13, comprising determining a particular power via having a minimum distance to the particular signal via.

16. The method of claim 15, comprising presenting the proximity alert by:
presenting a visual indication specifying the particular signal via for which none of the power vias is within the threshold distance parameter; and
presenting a visual indication specifying the particular power via having the minimum distance to the particular signal via.

17. A non-transitory machine readable medium comprising instructions executable by a processing resource to:
access an electronic circuit design of an electronic design automation (EDA) tool;
identify a particular signal net and a particular power net the particular signal net is referenced to in the electronic circuit design;
identify a particular signal via in the electronic circuit design corresponding to the particular signal net and power vias in the electronic circuit design corresponding to the particular power net;
determine a verification area surrounding the particular signal via as a circular area with a center point equal to a center of the particular signal via and a radius equal to a threshold distance; and verify that a center of at least one of the power vias is within the verification area; and in response to a determination that none of the centers of the power vias is within the verification area, generating a proximity alert.

18. The non-transitory machine readable medium of claim 17, wherein the instructions are executable by the processing resource to identify signal nets in the electronic circuit design and the threshold distance from user-provided input files, user inputs provided through a graphical user interface or user-provided code parameters.

19. The non-transitory machine readable medium of claim 17, wherein the instructions are executable by the processing resource to identify power nets in the electronic circuit design and the threshold distance from user-provided input files, user inputs provided through a graphical user interface or user-provided code parameters.

20. The non-transitory machine readable medium of claim 17, wherein the instructions are further executable by the processing resource to present the proximity alert through a user interface, including presenting a first visual indication specifying the particular signal via for which none of the power vias is within the threshold distance and a second visual indication specifying a particular power via having a minimum distance to the particular signal via.

* * * * *